(12) United States Patent
Toshinori

(10) Patent No.: US 6,204,726 B1
(45) Date of Patent: Mar. 20, 2001

(54) DIGITAL DEMODULATOR

(75) Inventor: Iinuma Toshinori, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/532,875

(22) Filed: Mar. 22, 2000

Related U.S. Application Data

(62) Division of application No. 09/068,117, filed as application No. PCT/JP96/03481 on Jun. 11, 1998.

(51) Int. Cl.$^7$ .................................................. H03D 3/00
(52) U.S. Cl. ......................... 329/304; 329/306; 375/329
(58) Field of Search .................................. 329/304, 305, 329/306, 307, 308, 309, 310; 375/329, 330, 331, 332, 333

(56) References Cited

U.S. PATENT DOCUMENTS

| | | | |
|---|---|---|---|
| 5,097,220 | * 3/1992 | Shimakata et al. | 329/306 |
| 5,511,097 | 4/1996 | Tsumura | 375/324 |
| 6,038,267 | * 3/2000 | Oura et al. | 375/329 |

FOREIGN PATENT DOCUMENTS

| | | |
|---|---|---|
| 464 814 | 1/1992 | (EP) . |
| 2-230845 | 9/1990 | (JP) . |
| 5-167631 | 7/1993 | (JP) . |
| 5-191465 | 7/1993 | (JP) . |
| 6-14070 | 1/1994 | (JP) . |
| 6-30063 | 2/1994 | (JP) . |

* cited by examiner

*Primary Examiner*—Robert Pascal
*Assistant Examiner*—Henry Choe
(74) *Attorney, Agent, or Firm*—Arent Fox Kintner Plotkin & Kahn PLLC

(57) ABSTRACT

A digital demodulator which demodulates information signals that have been phase-modulated using a method such as PSK (Phase Shift Keying). The adder 46 adds a compensation value held by the phase compensator 45 to phase difference data outputted from the comparator 43. The subtractor 47 subtracts phase difference data delayed by the delaying circuit 44 by one information symbol period from the sum of the phase difference data and the compensation value from the adder 46, thus performing delay detection. With this digital demodulator, an input signal can be received and demodulated even if its frequency is not an integral division of the frequency of a master clock signal, and an oscillator can be used even if its frequency is not an integral multiple of the frequency of an input signal to be demodulated.

3 Claims, 7 Drawing Sheets

DIGITAL DEMODULATOR

This is a divisional application of U.S. patent application Ser. No. 09/068,117, filed Jun. 11, 1998 which is a 371 of PCT/JP96/03481 filed Nov. 27, 1996.

FIELD OF THE INVENTION

The present invention relates to a digital demodulator for demodulating signals which have been phase-modulated by such methods as PSK (Phase Shift Keying).

BACKGROUND OF THE INVENTION

In recent years, digital communication devices have transmitted information signals after modulating carrier signals using digital information signals (baseband signals) to achieve efficient transmission. Such modulation has been performed using methods such as ASK (Amplitude Shift Keying) in which amplitudes of carrier signals are shifted based on digital baseband signals (modulating signals), FSK (Frequency Shift Keying) in which frequencies of carrier waves are shifted based on modulating signals, and QAM (Quadrature Amplitude Modulation) in which amplitudes and phases of carrier waves are independently changed based on modulating signals.

These digital modulation methods are currently used in various mobile communication systems. Digital demodulators in practical use which demodulate information signals transmitted in the above manner have a common feature (not identical, though) in that a baseband signal is detected from an input signal using a clock signal which has a frequency equal to an integral multiple of the frequency of the input signal.

FIG. 1 is a block diagram of a digital demodulator of the prior art. This digital demodulator demodulates signals which have been phase-modulated by QPSK (Quaternary Phase Shift Keying). A radio signal inputted via an antenna is received by a radio unit (not shown) and then sent to a comparator 12 in a phase detector 11 as an input signal. A master clock signal has a frequency which is set at an integral multiple of the frequency of the input signal. The frequency of the master clock signal is divided by a divider 13 in the phase detector 11 and then compared with the frequency of the input signal by the comparator 12, which outputs phase difference data. The frequency of the input signal is equal to that of the divided master clock signal.

The phase difference data outputted from the phase detector 11 is sent to a delaying circuit 14, by which it is delayed by one information symbol period. The phase difference data is also sent directly to a subtractor 15, which subtracts the delayed phase difference data from the original phase difference data. The subtraction result data is processed by a decision unit 17, which then outputs demodulated data. The decision unit 17 operates based on an operation clock signal generated by a clock signal regenerator 16, which generates operation clock signals in synchronization with the information symbol period.

FIG. 2 is a time chart of an unmodulated input signal (carrier wave) to be inputted to the digital demodulator and a divided master clock signal. The input signal is an unmodulated carrier signal, i.e., a carrier wave itself. A divided master clock signal is given by dividing the frequency of a master clock signal, which is an integral multiple of the frequency of the input signal. In this division, the frequency of the divided master clock signal is made equal to that of the input signal.

The phase difference between an input signal and a divided master clock signal is the constant value Pd. When an input signal is modulated, the phase difference Pd is shifted by the amount of modulation, and the modulated input signal can be demodulated based on the amount of shift.

However, when the frequency of a master clock signal is not an integral multiple of the frequency of an input signal, the input signal (carrier) is not in synchronization with the divided master clock signal, as shown in FIG. 3. Here, the phase difference varies, as shown by PD1, PD2, PD3, and PD4. When an input signal is modulated, the amount of modulation is added to this varying phase difference so that it is difficult to demodulate the modulated input signal based on the phase difference as it is.

As shown in the above prior art, phase detectors of digital demodulators in practical use require each master clock signal to have a frequency which is an integral multiple of the frequency of each input signal.

With such configuration, however, an input signal needs to have a frequency which is an integral multiple of the frequency of a master clock signal, otherwise, the input signal can not be received.

This configuration also imposes restrictions on device design, since an oscillator needs to have a frequency which is an integral multiple of the frequency of an input signal to be demodulated.

To eliminate these problems, the present invention aims to provide a digital demodulator which imposes no restrictions on device design, regardless of the frequencies of input frequencies.

SUMMARY OF THE INVENTION

The digital demodulator of the present invention includes: a phase data output unit for comparing a phase-modulated input signal with a clock signal which is not in synchronization with the carrier wave of the input signal, and then outputting phase data which corresponds to the phase difference between the input signal and the clock signal; a delaying unit for delaying the phase data outputted from the phase data output means by a predetermined period of time; a compensation value hold unit for holding a compensation value which corresponds to the phase shift caused by the frequency difference between the carrier wave of the input signal and the clock signal; a delay detection unit for detecting the delay time of the phase data from the phase data output unit, using the phase data outputted from the phase data output unit, the compensation value held by the compensation value hold unit, and the phase data delayed by the delaying unit by the predetermined period of time; and a demodulation unit for demodulating the input signal based on the result of the delay time calculation.

In such digital demodulator, the delay detection unit is capable of calculating a delay time using the compensation value held by the compensation value hold unit, so that an input signal can be received and demodulated even if its frequency is not an integral multiple of the frequency of a master clock signal. Furthermore, an oscillator having a frequency which is not an integral multiple of the frequency of an input signal to be demodulated can be employed in this digital demodulator, allowing more freedom in device design, regardless of the frequencies of input signals.

The delay detection unit of such digital demodulator includes an addition unit for adding the phase data from the phase data output unit and the compensation value held by the compensation value hold unit, and a substraction unit for subtracting the phase data delayed by the delaying unit by the predetermined period of time from the addition result by the addition unit.

The installation of such addition unit and subtraction unit enables calculation of the delay time using the compensation value held by the compensation value hold unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

PREFERRED EMBODIMENTS OF THE INVENTION

Figure 1:
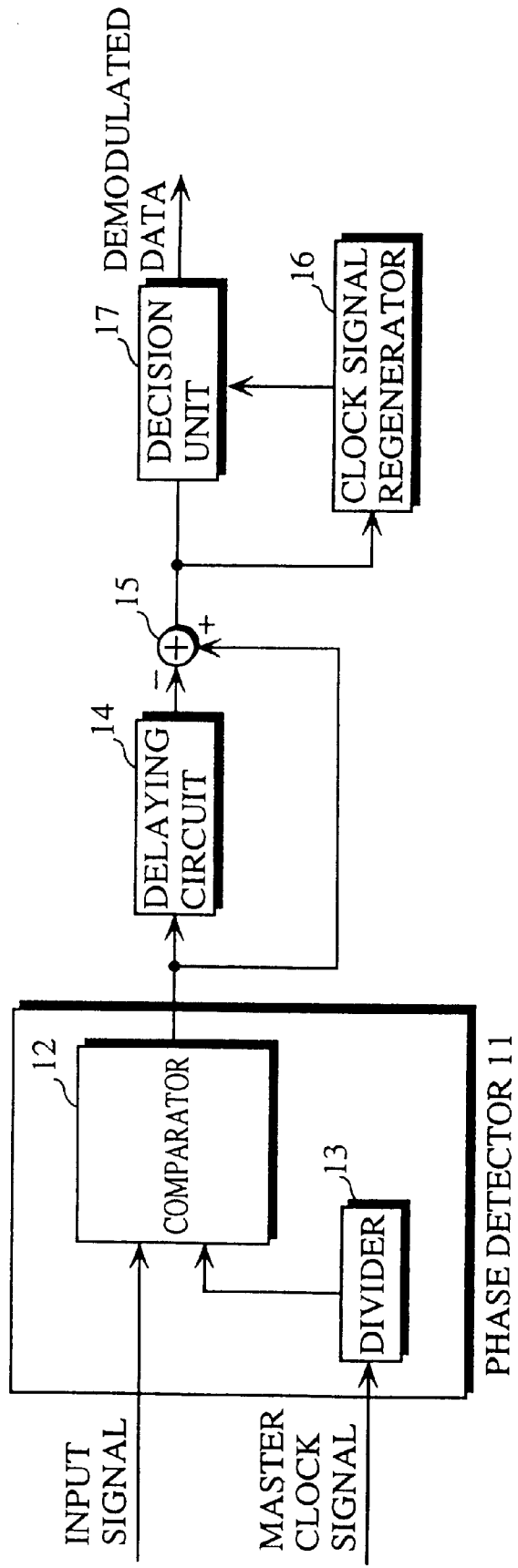
FIG. 1 is a block diagram of a digital demodulator of the prior art.
Figure 2:
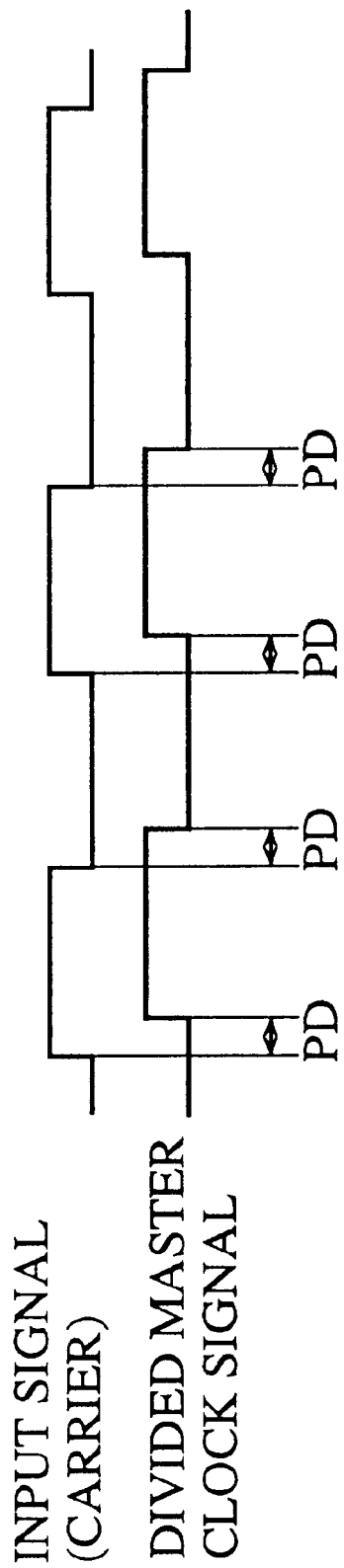
FIG. 2 is a time chart of an unmodulated input signal (carrier wave) to be inputted to the digital demodulator and a divided master clock signal.
Figure 3:
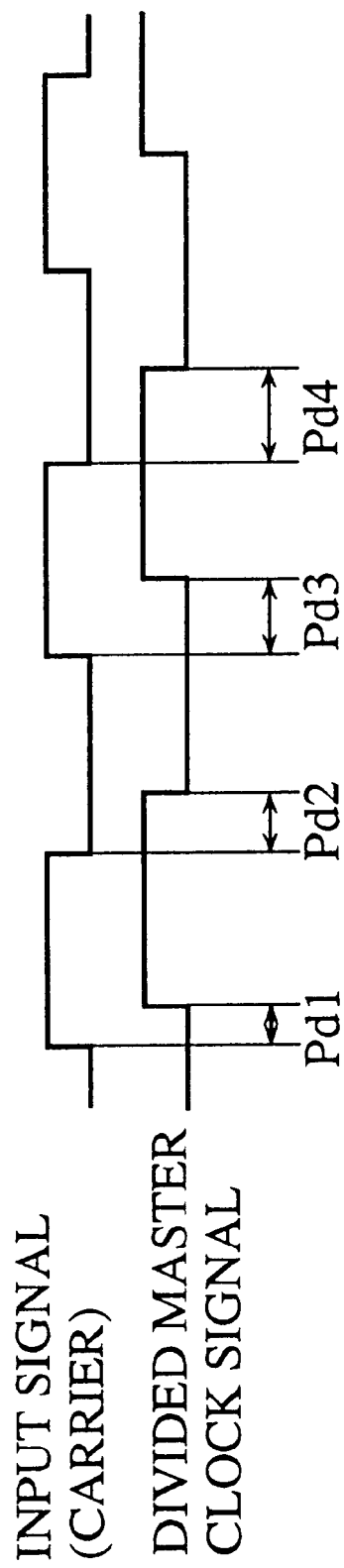
FIG. 3 is a time chart of an input signal (carrier) and a divided master clock signal, where the frequency of the master clock signal is not an integral multiple of the frequency of the input signal.
Figure 4:
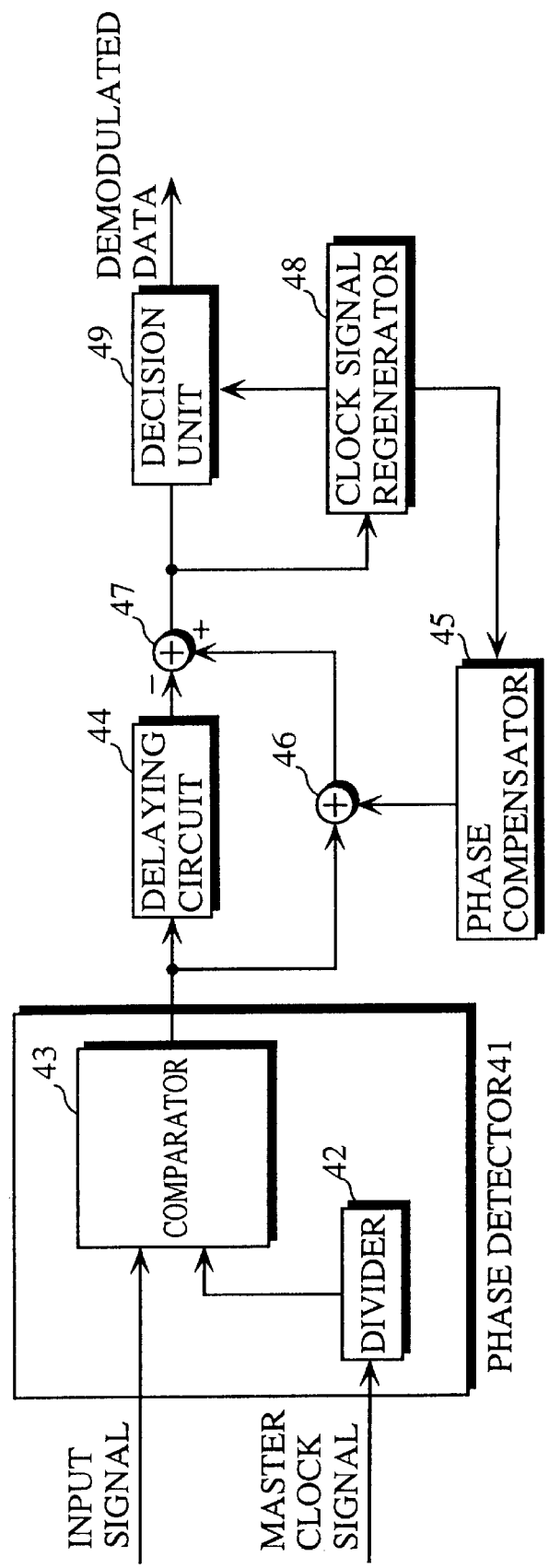
FIG. 4 is a block diagram of a digital demodulator of an embodiment of the present invention.

FIG. 4 shows the configuration of the digital demodulator of this embodiment. This digital demodulator demodulates signals which have been phase-modulated by QPSK. It comprises a phase detector 41, a divider 42, a comparator 43, a delaying circuit 44, a phase compensator 45, an adder 46, a subtractor 47, a clock signal regenerator 48, and a decision unit 49.

In the phase detector 41, which includes the divider 42 and the comparator 43, an input signal is compared with a divided master clock signal, and phase difference data is then outputted. As in the prior art, the input signal is a signal outputted from a radio unit (not shown in the figure) which receives transmitted radio signals transmitted via an antenna. Such input signal has a modulating signal as a phase difference of the input signal. The frequency of a master clock signal is not an integral multiple of the frequency of the input signal and it is generated by an oscillator which is independent of the clock signal regenerator 48.

The divider 42 receives the master clock signal and divides it so that the frequency of the master clock signal becomes equal to the frequency of the input signal.

The comparator 43 operates in accordance with master clock signals. It compares the input signal with the divided master clock signal from the divider 42 and then outputs the phase shift of the input signal as phase difference data. The phase difference data contains an amount of the phase shift which is caused by the frequency difference between the input signal and the divided signal, as well as the phase difference which corresponds to the amount of modulation of the input signal. Such phase difference data is outputted by the comparator 43 as 5-bit numerical data which represents 0 to 31.

The delaying circuit 44 latches the phase difference data outputted from the comparator 43 and delays it by one information symbol period.

The phase difference compensator 45 is formed by a register and holds a phase compensation value which is exclusively determined by the amount of a phase shift determined by the frequency difference between a divided master clock signal and an input signal. The amount of phase shift in one information symbol period is given by the following formula:

$$\text{amount of shift } |\Delta\theta| = \frac{|\text{frequency of carrier wave} - \text{frequency of divided signal}|}{\text{frequency of information symbol period}} \cdot 2\pi$$

This amount of shift is then converted into a 5-bit integer (0–31) to give the phase compensation value.

The adder 46 adds the phase compensation value held by the phase compensator 45 to the phase difference data outputted from the comparator 43 in every information symbol period.

The subtractor 47 subtracts the phase difference data plus the phase compensation value from the phase difference data delayed by one information symbol period by the delaying circuit 44. The amount of phase of a phase difference corresponding to the amount of modulation of each input signal in one information symbol period is thus calculated.

The clock signal regenerator 48 is formed by a PLL circuit and regenerates an operation clock signal in synchronization with one information symbol period according to an input signal. The delaying circuit 44, the phase compensator 45, the adder 46, the subtractor 47, and the decision unit 49 operate in accordance with the operating clock signal regenerated from the clock signal regenerator 48.

The decision unit 49 outputs demodulated data in accordance with the subtraction result from the subtractor 47.

The following explanation is for the operation of the digital demodulator. Referring now to the time chart in FIG. 5, the upper half of the figure shows an input signal, an unmodulated input signal, a divided master clock signal, a phase difference, and a compensation value. In the lower half of the figure, an enlarged detail of the time chart is shown. For ease of explanation, the start edge of every signal has been aligned, as can be seen from the left edge of the time chart in the upper half of the figure.

The first signal at the top in the figure is an input signal. The pulse width of this input signal varies depending on the amount of modulation. The input signal carries a modulating signal which has 6 cycles as one information symbol period. The second signal from the top is an unmodulated input signal, i.e., the carrier wave of the input signal. The first input signal has a smaller pulse width than that of the carrier wave as a result of modulation. The phase difference between the carrier wave and the input signal is the amount of the modulation caused by the modulating signal. The second input signal (carrier) is shown here for ease of explanation, but in practice, this kind of signal is not inputted to the demodulator of this embodiment.

The third signal from the top is a signal obtained by dividing a master clock signal using the divider 42. The comparator 43 compares this divided signal with the input signal and outputs the rise time difference as the phase difference between the divided signal and the input signal. This phase difference between the input signal and the divided signal is indicated as D0, D1, D2, . . . on the fourth line in FIG. 5. The phase difference is outputted by the comparator 43 for every cycle of each input signal.

In the lower half of the figure is shown an enlarged detail of the input signal, the unmodulated input signal, and the divided signal, in conjunction with a master clock signal, where D5 is outputted as phase difference data.

The phase difference data represents the rise time difference between the input signal and the divided master clock signal, and more specifically, it is 5-bit numerical data showing the number of cycles by which the rise time difference is represented. In this embodiment, for example, the comparator 43 contains a counter (not shown in the figure) which operates in accordance with master clock signals and outputs the counter data "16" as phase difference data. As can be seen from the figure, such phase difference data includes the amount of modulation of the input signal and the amount of phase shift caused by the frequency difference between the input signal (carrier) and the divided signal. In this example, the amount of modulation is 10 while the amount of phase shift is 6.

The fifth line from the top shows that a compensation value held by the phase compensator 45 is outputted to the adder 46 in one information symbol period (more specifically, in the last cycle of one information symbol period). In this embodiment, "6" is outputted as the value of the phase shift caused by the frequency difference between the input signal (carrier) and the divided signal.

Figure 6:
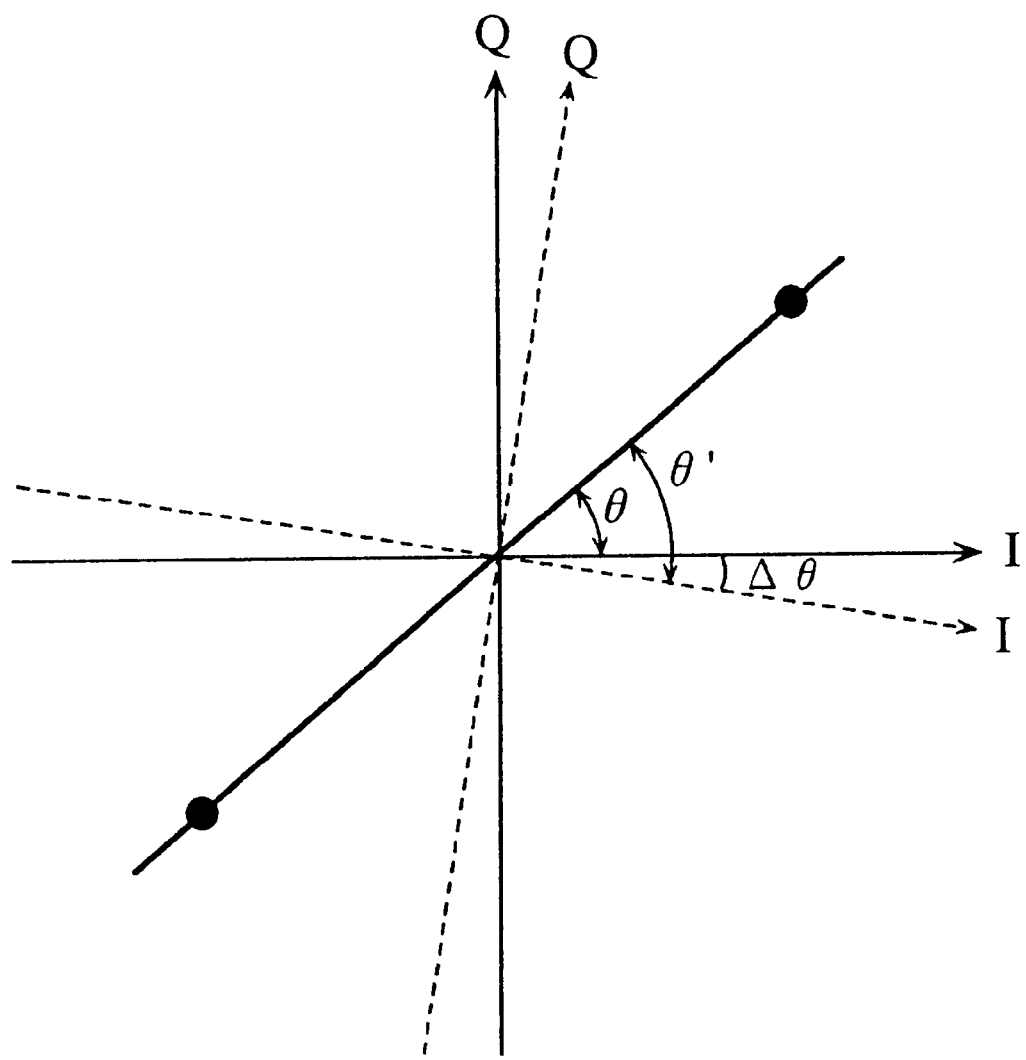
FIG. 6 shows a subtraction result of a subtractor 47, using P and Q coordinates.

FIG. 6 shows P and Q coordinates by which the subtraction result by the subtractor 47 is represented. θ is a phase value which varies depending on modulation systems (in the case of QPSK, θ is 0, ±π/2, or π). Δθ represents the amount of the phase shift caused by the frequency difference between the input signal (carrier) and the divided signal. Such phase shift value is equal to the phase compensation value held by the phase compensator 45. θ' represents the phase difference which is a result outputted by the subtractor 47 in the case where neither phase compensator 45 nor adder 46 is provided. Without the phase compensator 45 and the adder 46, a phase shift value Δθ is caused due to the frequency difference between the input signal (carrier) and the divided signal. By providing the phase compensator 45 and others, however, the phase shift value Δθ can be eliminated and a desired phase value Δθ can be obtained.

In the above explanation, the comparator 43 outputs numerical data as phase difference data from a counter (not shown in the figure) in accordance with a master clock signal, but other ways may be employed as long as the phase difference between an input signal and a divided signal is given.

Figure 5:
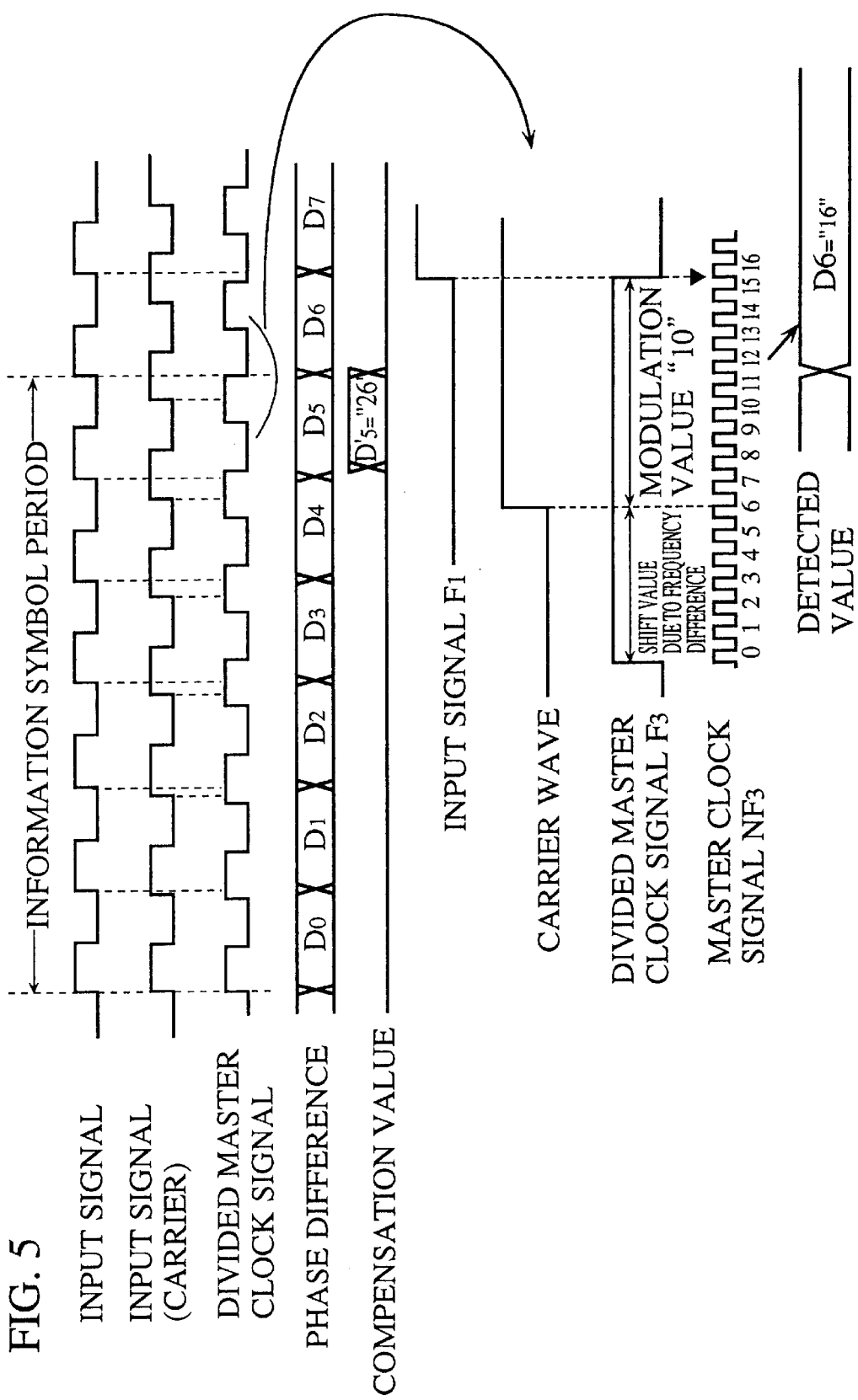
FIG. 5 is a time chart of input and other signals.

In this embodiment, one compensation value is added to phase difference data once per information symbol period, as shown in the time chart in FIG. 5, although such a compensation value may be divided into several parts which are then added separately to the phase difference data.

Figure 7:
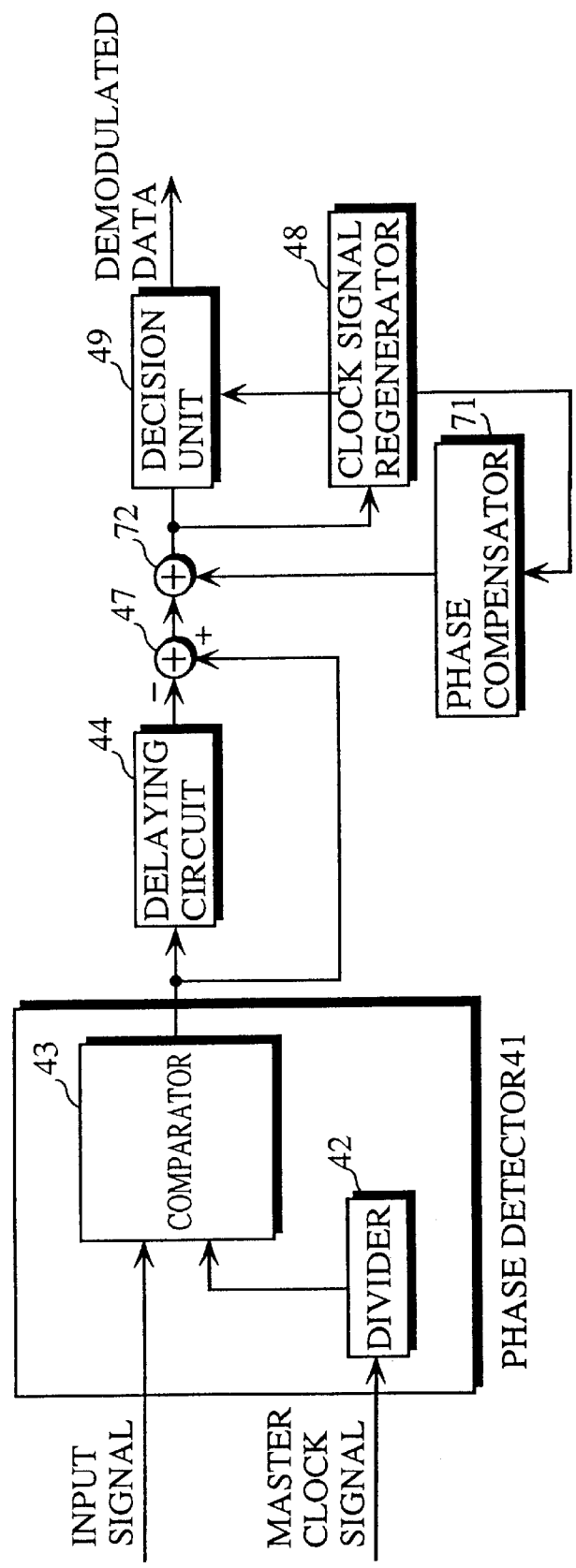
FIG. 7 shows a modification of the digital demodulator of the embodiment.

In this embodiment, a compensation value is added to phase difference data which is not delayed by one information symbol period, as shown by the phase compensator 45 and the adder 46 in FIG. 4, but the addition is not necessarily performed there. As shown by the phase compensator 71 and the adder 72 in FIG. 7, for instance, a compensation value can be added to the result of the subtraction by the subtractor 47.

A compensation value held by the phase compensator 45 can be subtracted from phase difference data right after the delaying process by the delaying circuit 44 or from the previous phase difference data. That is, a compensation value is added so that a value to be inputted to the decision unit 49 is (A−B+x), where A is phase difference data, B is phase difference data delayed by one information symbol period, and x is a compensation value.

As described so far, the digital demodulator of the present invention imposes no restrictions on device design, regardless of the frequencies of input signals, because a compensation value corresponding to the phase difference between a divided master clock signal and a carrier wave of an input signal is added in synchronization with information symbol periods. As a result, demodulation can be carried out even if the frequency of the master clock signal is not an integral multiple of that of the input signal.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL FIELD IN WHICH THE INVENTION CAN BE UTILIZED

The digital demodulator of the present invention is effective in communication systems which use digital modulation methods for demodulating phase modulation, with PSK (Phase Shift Keying) being the most desirable method.

What is claimed is:

1. A digital demodulator comprising:

phase difference data output means for comparing a phase-modulated input signal with a clock signal which is not in synchronization with the carrier wave component of the input signal, and outputting phase difference data which corresponds to the phase difference between the input signal and the clock signal;

delaying means for delaying the phase difference data outputted from said phase difference data output means by a predetermined period of time;

compensation value hold means for holding a compensation value which corresponds to a phase shift caused by the frequency difference between the carrier wave component and the clock signal;

delay detection means for detecting a delay of the phase difference data outputted from said phase difference data output means using the phase difference data outputted from said phase difference data output means, the compensation value held by said compensation value hold means, and the phase difference data delayed by said delaying means by the predetermined period of time; and demodulation means for demodulating the input signal based on the result of the delay detection, addition means and subtraction means perform addition and subtraction, respectively, in accordance with a second clock signal which is in synchronization with information symbol periods.

2. A digital demodulator comprising:

phase difference data output means for comparing a phase-modulated input signal with a clock signal which is not in synchronization with the carrier wave component of the input signal, and outputting phase difference data which corresponds to the phase difference between the input signal and the clock signal;

delaying means for delaying the phase difference data outputted from said phase difference data output means by a predetermined period of time;

compensation value hold means for holding a compensation value which corresponds to a phase shift caused by the frequency difference between the carrier wave component and the clock signal;

delay detection means for detecting a delay of the phase difference data outputted from said phase difference data output means using the phase difference data outputted from said phase difference data output means, the compensation value held by said compensation value hold means, and the phase difference data delayed by said delaying means by the predetermined period of time; and demodulation means for demodulating the input signal based on the result of the delay detection, wherein the predetermined delay period of time caused by said delaying means is an information symbol period.

3. A digital demodulator comprising:

phase difference data output means for comparing a phase-modulated input signal with a clock signal which is not in synchronization with the carrier wave component of the input signal, and outputting phase difference data which corresponds to the phase difference between the input signal and the clock signal;

delaying means for delaying the phase difference data outputted from said phase difference data output means by a predetermined period of time;

compensation value hold means for holding as a compensation value a fixed value which corresponds to a phase shift caused by the frequency difference between the carrier wave component and the clock signal;

differential detection means for performing a differential detection using the phase difference data outputted from said phase difference data output means, the compensation value held by said compensation value hold means, and the phase difference data delayed by said delaying means by the predetermined period of time; and demodulation means for demodulating the input signal based on the result of the delay detection, wherein a frequency of the clock signal is willingly selected so that the frequency of the clock signal is different from a frequency of the carrier wave component, and the fixed value corresponds to the phase shift that is uniquely determined by the frequency difference in one symbol period between the carrier wave component and the clock signal.

* * * * *